United States Patent [19]

Verduijn

[11] Patent Number: 6,019,956

[45] Date of Patent: Feb. 1, 2000

[54] ZEOLITES AND PROCESSES FOR THEIR MANUFACTURE

[75] Inventor: Johannes Petrus Verduijn, Leefdaal, Belgium

[73] Assignee: Exxon Chemical Patents Inc., Houston, Tex.

[21] Appl. No.: 08/809,163

[22] PCT Filed: Jul. 9, 1996

[86] PCT No.: PCT/EP96/03096

§ 371 Date: Jun. 20, 1997

§ 102(e) Date: Jun. 20, 1997

[87] PCT Pub. No.: WO97/03020

PCT Pub. Date: Jan. 30, 1997

[30] Foreign Application Priority Data

Jul. 10, 1995 [EP] European Pat. Off. .............. 95304798

[51] Int. Cl.[7] .................................................. C01B 39/30
[52] U.S. Cl. .................... 423/705; 423/709; 423/716; 423/DIG. 38
[58] Field of Search ................................... 423/705, 709, 423/716, DIG. 38

[56] References Cited

U.S. PATENT DOCUMENTS

| 3,578,398 | 5/1971 | Jenkins ............................ 423/DIG. 38 |
| 3,781,225 | 12/1973 | Schwartz . |
| 3,808,326 | 4/1974 | McDaniel et al. ...................... 423/709 |
| 3,947,482 | 3/1976 | Albers et al. ............................ 423/705 |
| 3,969,426 | 7/1976 | Owen et al. . |
| 4,166,099 | 8/1979 | McDaniel et al. ...................... 423/709 |
| 4,994,250 | 2/1991 | Occelli ............................ 423/DIG. 38 |
| 5,133,951 | 7/1992 | Occelli ............................ 423/DIG. 38 |
| 5,756,064 | 5/1998 | Verduijn ................................. 423/705 |

FOREIGN PATENT DOCUMENTS

| 400961 | 12/1990 | European Pat. Off. . |
| 1232429 | 5/1971 | United Kingdom . |
| 2160188 | 12/1985 | United Kingdom . |
| 92/14680 | 9/1992 | WIPO . |
| 93/08125 | 4/1993 | WIPO . |
| 94/25151 | 11/1994 | WIPO . |

OTHER PUBLICATIONS

Inui et al., Chem. Ab. vol. 96 No. 162052c, pp. 695–696, 1982.

Primary Examiner—Mark L. Bell
Assistant Examiner—David Sample
Attorney, Agent, or Firm—Edward F. Sherer

[57] ABSTRACT

Colloidal Offretite, a process for its manufacture, and zeolite manufacture using it.

15 Claims, 9 Drawing Sheets

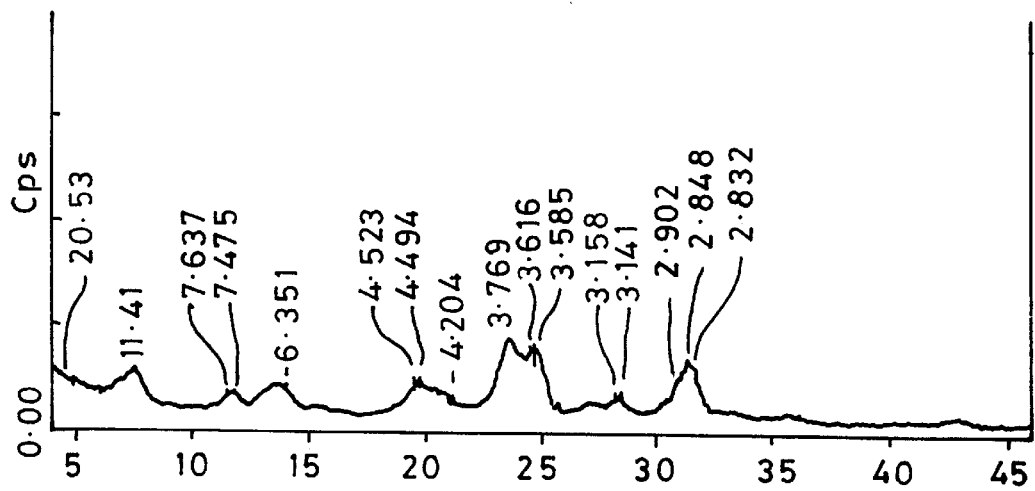
FIG. 5  SAMPLE DRIED
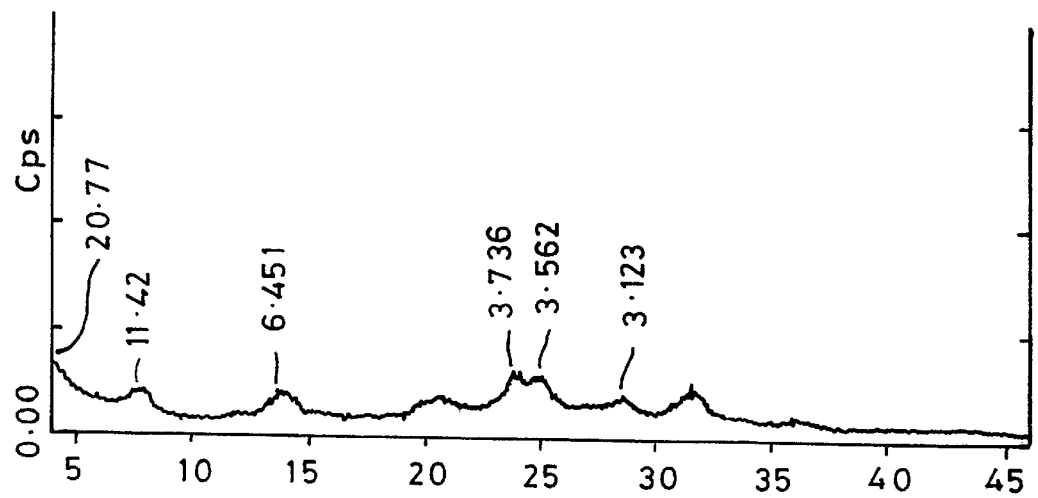
FIG. 6  SAMPLE CALCINED 40,000 * SEM MICROGRAPH
1 HOUR AT 150°C FORMATION OF THE FIRST CRYSTALS 40,000 * SEM MICROGRAPH
4 HOURS AT 150°C FULLY CRYSTALLINE PRODUCT

2500*
NO SEEDS ADDED

2wt ppm SEEDS ADDED 10,000×

40,000 *
PRODUCT EX. 11 UNIFORM PARTICLES WITH A SIZE OF ~0.25 MICRONS 40,000 *
PRODUCT EX. 12 UNIFORM PARTICLES WITH A SIZE OF ~0.20 MICRONS

ZEOLITES AND PROCESSES FOR THEIR MANUFACTURE

This invention relates to the zeolite Offretite, to processes for its manufacture, and to the use of the zeolite as catalyst.

A traditional synthesis of Offretite obtains the zeolite from synthesis mixtures relatively rich in potassium and containing the tetramethylammonium cation as template or structure directing agent. The resulting product has a relatively large particle size.

EP-A-400961 describes a synthesis of Offretite using a synthesis mixture containing metakaolin obtained by calcination at a temperature of at least 550° C., the resulting product having an average particle size in the range of 0.1 to 10 μm.

WO 92/14680 describes the use of additional, divalent, cations to facilitate manufacture of Offretite of small particle size. U.S. Pat. No. 3,578,398 describes a procedure for producing "sub-micron" Offretite.

WO 93/08125 describes the preparation of MFI, MEL and Beta zeolites of particle size sufficiently small to enable a colloidal suspension to be formed; in general for this purpose the largest dimension of the particles is required to be at most 100 nm.

Products of small particle size have advantages over larger particle size products, for example, when used as a catalyst, e.g., in hydrocarbon conversions, they have an enhanced ratio of surface area to mass, high diffusion rates, reactivities and resistance to deactivation by pore plugging and surface contamination. Similarly, they have advantages in organic separations, and are also valuable in the manufacture of supported layers, especially membranes, as described in WO 94/25151. In certain of the procedures described in that patent application, the disclosure of which is incorporated herein by reference, the zeolite layer is deposited from a colloidal suspension onto a support; instability in the suspension is deleterious. Accordingly, it would be desirable to be able to manufacture Offretite capable of forming a stable suspension, and for this purpose a particle size of at most 100 nm, and advantageously at most 75 nm, is desirable. A stable suspension is one in which no settlement takes place at all, or one in which settlement takes place so slowly as to be insignificant over the time scale concerned. Such a suspension is referred to herein as colloidal and particles capable of forming such a suspension may be referred to as colloidal size particles.

The present invention is based on the observation that if the concentration of inorganic cations, especially potassium, in the synthesis mixture is reduced from that typically previously used a colloidal suspension of Offretite may be obtained. It has surprisingly been found also that it is not in fact essential for the synthesis mixture to be clear and homogeneous as previously suggested, e.g., in WO 93/08125, as necessary for colloidal zeolite production. Similarly WO 94/05597 indicates that though a clear synthesis mixture is a necessary condition for the manufacture of colloidal zeolites, it is not a sufficient one. Surprisingly, mixture in which, for example, the source of silicon is incompletely dissolved, is capable of yielding uniform colloidal-size Offretite crystals.

The present invention accordingly provides a process for the manufacture of a colloidal suspension of Offretite, wherein a synthesis mixture having a molar composition, when calculated in terms of oxides, in the following ranges:

| | |
|---|---|
| $K_2O:Al_2O_3$ | 0.25 to 0.5:1 |
| $(TMA)_2O:Al_2O_3$ | at least 2.0:1 |
| $SiO_2:Al_2O_3$ | 8 to 10:1 |
| $H_2O:Al_2O_3$ | 80 to 100:1 | wherein TMA represents the tetramethylammonium cation, is subjected to thermal treatment at a temperature and for a tine sufficient to form a colloidal suspension of Offretite.

Advantageously, the molar ratio of $(TMA)_2O:Al_2O_3$ is 2.0 to 3.5:1.

The process according to this aspect of the invention has the advantage of being capable of providing a stable suspension free from unreacted solid starting material.

The invention further provides a process for the manufacture of the zeolite Offretite of particle size at most 100 nm, wherein a colloidal suspension prepared as described above is washed with water, advantageously to a pH within the range of from 9 to 12, if desired cation exchanged, dried and, if desired, calcined.

The process of the invention provides individual crystals, rather than agglomerates, and the suspension produced directly, or by washing, is a stable one.

The invention also provides a colloidal suspension of zeolite Offretite. The invention further provides Offretite of a particle size of at most 100 nm. The invention also provides the use, in a process for the thermal treatment of a synthesis mixture to form Offretite, of a synthesis mixture having a molar ratio of $K_2O:Al_2O_3$ of from 0.25 to 0.5:1 and of $(TMA)_2O:Al_2O_3$ of at least 2.0:1.

As described above, the zeolite of the invention is primarily an aluminosilicate, and will be described herein as such. It is, however, within the scope of the invention to replace aluminium wholly or partly with gallium, and partly with boron, iron or other trivalent elements, and silicon may similarly be replaced by germanium or phosphorus. It is also within the scope of the invention to include inorganic cations other than potassium, e.g., sodium, in the synthesis mixture.

The sources of the various elements required in the final product may be any of those in commercial use or described in the literature, as may the preparation of the synthesis mixture.

For example, the source of silicon may be a silicate, e.g., an alkali metal silicate, a tetraalkyl orthosilicate, or an aqueous colloidal suspension of silica, for example one sold by E.I. du Pont de Nemours under the trade name Ludox. Ludox HS-40 is a sodium-containing product, while AS-40 contains very little sodium. Preferably, however, the source is silica powder.

The source of aluminium is preferably aluminium metal, e.g., in the form of chips, dissolved in the alkaline solution of structure-directing agent. Other aluminium sources include, for example, hydrated alumina, a water-soluble aluminium salt, e.g., aluminium sulphate, or an alkoxide, e.g., aluminium isopropoxide.

The potassium source is advantageously potassium hydroxide.

The TMA cation may be introduced in the hydroxide form, which is commercially available as a powder as the pentahydrate, or as an aqueous solution, which is preferred. The cation may also be introduced in the form of a mixture of hydroxide and salt, e.g. a halide; preferably a major proportion of the cation is introduced in the form of hydroxide.

The synthesis mixture is conveniently prepared by dissolving the aluminium source and potassium source in a solution of the TMA source, adding the silica source, heating to boiling, cooling, and correcting for water loss such that the required molar proportions result.

Crystallization is effected, either under static conditions or with moderate stirring, and, if desired, under reflux.

Thermal treatment (otherwise known as ageing at elevated temperatures) at a temperature in the range of from 40, more especially 60, to 100° C. is convenient; advantageously from 75 to 95° C. and preferably at about 85° C. Suitable crystallization times are within the range of from 48 to 500 hours, preferably from 120 to 240 hours. A lower temperature in general gives a smaller particle size zeolite, if other conditions remain constant. By appropriate choice of temperature, crystals of greatest dimensions in the range of 25 nm to 100 nm may be obtained. A period of ageing at a temperature below that at which crystallization takes place may precede thermal treatment; smaller particle size material then results.

The colloidal suspension, or the crystals obtainable from the suspension, produced by the processes described above may be used in a number of applications including in the manufacture of thin films on substrates, in which application the crystals may provide a growth-enhancing layer, or as the base of the film itself, for example by multiple in-situ crystallization. More especially, however, according to the present invention, the nanometric sized crystals may be used as seeds in the manufacture of Offretite.

The present invention accordingly also provides, in a second aspect of the invention, a process for the manufacture of Offretite which comprises forming an Offretite-forming synthesis mixture, advantageously having a molar composition, calculated in terms of oxides, in the following ranges:

| | |
|---|---|
| $M_2O:Al_2O_3$ | 1.3 to 4.0:1 |
| $(TMA)_2O:Al_2O_3$ | 0.2 to 0.6:1 |
| $SiO_2:Al_2O_3$ | 7 to 13:1 |
| $H_2O:Al_2O_3$ | 50 to 540:1 | wherein M represents potassium, of which up to 30 molar per cent may be replaced by sodium, and also containing seed crystals of Offretite of maximum dimension at most 100 nm, and subjecting the seed-containing synthesis mixture to hydrothermal treatment at a temperature and for a time sufficient to form Offretite.

As indicated above, it is possible to replace aluminium by gallium; the invention accordingly also provides a process in which the synthesis mixture is as defined above, in which $Al_2O_3$ is replaced by $Ga_2O_3$.

The lower the proportion of potassium, the lower the preferred water content of the synthesis mixture.

It has been found that the presence of the nanometric-sized seed crystals significantly accelerates the formation of Offretite from the synthesis mixture. Further, it has been found that very small proportions of the colloidal seed crystals are effective to promote crystallization of Offretite. The process may employ very small proportions of colloidal seeds, e.g., from 0.0002 to 0.1%, by weight of the total synthesis mixture, adantageously from 0.01 to 0.05%, and conveniently about 0.025%, although it will be understood that it is within the scope of the invention to use a higher proportion. Since the proportion of seeds may be so low, it is possible to employ alumina-derived seeds in Ga-Offretite manufacture without affecting the essential gallium-based nature of the product. The gallium product may present advantages over the aluminium product because of its lower acidity (at a given molar composition).

Hydrothermal treatment of the seeded synthesis mixture is advantageously carried out at a temperature within the range of from 100° C. to 200° C., preferably from 125° to 175° C. and conveniently at about 150° C., advantageously for a time within the range of from 2 to 10 hours, preferably within the range of from 3 to 6 hours. This compares with a time within the range of from 16 to 48 hours for a synthesis mixture of the same composition but without seeds. Treatment may be carried out with gentle stirring or, preferably, statically.

The source of the various components of the synthesis mixture, other than the seeds, may be as described above for the first embodiment of the invention, except that colloidal silica is preferred as the silica source, a TMA halide as the structure-directing agent, and hydrated alumina as the alumina source. The seeds are advantageously the product of the first embodiment of the invention.

The invention further provides the use, in the hydrothermal treatment of an Offretite-forming synthesis mixture, of a colloidal suspension of Offretite seeds, i.e., a suspension of seeds of Offretite having a greatest dimension of at most about 100 nm, to promote or accelerate he formation of zeolite Offretite.

The use of colloidal seed crystals in the synthesis mixture results in a product of more uniform size and shape than an unseeded synthesis mixture.

As indicated above, only very small proportions of colloidal seed crystals are needed to accelerate Offretite formation. It has, however, surprisingly been found that, under given synthesis conditions, variation of the proportion of seed crystals effects a change in the particle size of the resulting Offretite product, a greater numerical concentration of seeds resulting in a smaller product, thereby providing accurate control of product particle size.

The present invention accordingly further provides, in a third aspect, the use, in a process for the manufacture of Offretite by hydrothermal treatment of an Offretite-forming synthesis mixture, of the concentration of colloidal Offretite seeds in the mixture to control the particle size of the product.

It has also been found that lowering the alkalinity of a seeded synthesis solution reduces the particle size of the resulting Offretite product.

In a particular synthesis mixture, described in an example below, by increasing the concentration of colloidal seed crystals from 2 ppm (0.0002%) to 1000 ppm (0.1%) the particle size (greatest dimension) of the resulting product was decreased from about 1.5 $\mu$m to about 0.20 $\mu$m, with intermediate concentrations resulting in intermediate product particle sizes. Further the particle size distribution was in each case narrow, and the crystals uniform in shape.

In contrast, a synthesis mixture, unseeded but otherwise identical, gave generally larger particle size product, as might be expected, but also one of a wide particle size distribution. A mixture seeded with 5 $\mu$m size crystals gave a product of multilayer particle size and poor size uniformity.

The invention accordingly also provides the use, in a process for the manufacture of Offretite by hydrothermal treatment of an Offretite-forming synthesis mixture, or colloidal Offretite seeds to enhance the uniformity of particle size of the resulting product.

Preferred reaction conditions, except for choice of concentration of seeds, are as described with reference to the second aspect of the invention.

As indicated above, the traditional Offretite synthesis employs a mixture containing the TMA cation. Since disposal of organic residues from manufacturing processes is becoming increasingly difficult or expensing, it would be desirable to have a process for Offretite manufacture in which the need for an organic template or structure directing agent was obviated. Such a procedure would also have advantages in ease of handling the synthesis mixture, and could avoid the need for calcining to remove the template.

It has now surprisingly been found that the presence of colloidal Offretite seeds in the synthesis mixture makes the presence of an organic template unnecessary.

The present invention, in a fourth aspect, accordingly further provides a process for the manufacture of Offretite which comprises forming a synthesis mixture, substantially, and preferably completely, free from a free organic structure directing agent, and having a molar composition, calculated in terms of oxides, in the following ranges:

| | |
|---|---|
| $M_2O:Al_2O_3$ | 1.9 to 2.1:1 |
| $SiO_2:Al_2O_3$ | 9 to 11:1 |
| $H_2O:Al_2O_3$ | 140 to 180:1 | wherein M represents potassium, of which up to 30 molar per cent may be replaced by sodium, and also containing seed crystals of Offretite of maximum dimension at most 100 nm, and subjecting the seed-containing synthesis mixture to hydrothermal treatment for a time and at a temperature sufficient to form Offretite.

The preferred reaction conditions, except for the absence of organic reagent (other than that possibly introduced within the channels of the seeds), are as described above with reference to the second aspect of the invention, although a longer time may be needed.

The Offretite produced by the second, third and fourth aspects of the invention, if required after washing, cation exchange and/or calcining, is suitable for use as a catalyst in numerous hydrocarbon conversions and is effective in hydrocarbon separations or adsorptions. The Offretite material may be used alone, or in admixture with other zeolites, in particulate form or in the form of a layer on a support, especially in the form of a membrane. Hydrocarbon conversions include, for example, cracking, reforming, hydrofining, aromatization, alkylation, isomerization and hydrocracking.

BRIEF DESCRIPTION OF THE DRAWINGS

FIG. 5 is an x-ray diffraction pattern of the dried product of Example 3.

FIG. 6 is an x-ray diffraction pattern of the calcined product of Example 3.

The following examples illustrate the invention.

EXAMPLE 1

This example illustrates the production of Offretite of particle size as low as 70 nm by the use of a synthesis mixture having higher template and lower potassium content than traditionally used. The synthesis mixture contained the following components.

| | Parts by Weight |
|---|---|
| KOH pellets, 87.4% wt purity (Baker) | 3.4 |
| TMAOH, 25% by weight in water (Fluka) | 108.52 |
| Al chips, 99.99% wt purity (Fluka) | 2.8924 |
| $SiO_2$ powder, 89.8% wt, 10.2% water (Baker) | 35.52 |

(The TMAOH was contaminated with potassium.)

The KOH pellets were dissolved in the TMAOH solution in a glass beaker at room temperature, and the Al chips then dissolved in the resulting solution with stirring and gentle heat. After addition of the silica powder, the mixture was heated to boiling with stirring and kept at boiling point for 5 minutes. It was apparent that not all the silica had dissolved, some settling on the base of the glass beaker. The molar composition of the synthesis mixture, taking into account the potassium present in the TMAOH, was:

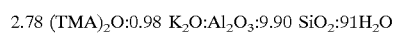

2.78 $(TMA)_2O:0.98\ K_2O:Al_2O_3:9.90\ SiO_2:91H_2O$

The synthesis mixture was homogenized by vigorous stirring for several minutes, then immediately poured into a plastic bottle which was then placed in an oil bath, the open end of the bottle being connected to a reflux condenser. The oil bath was heated to 85° C., and maintained at that temperature over a period. The appearance of the mixture gradually changed, with the quantity of deposited silica reducing, while the mixture developed a whitish appearance. Heating was terminated after 160 hours, with the contents of the bottle whitish and more viscous than the starting mixture.

The product was washed several times, using a high speed centrifuge to decant the wash water, and dried overnight at 110° C. X-ray diffraction (XRD) showed an excellently crystalline pure Offretite, while scanning electron microscopy (SEM) showed particles uniform in shape and size, with dimensions about 200×70 nm.

This example illustrates the synthesis of material on the borderline of colloidal particle size.

Figure 1:
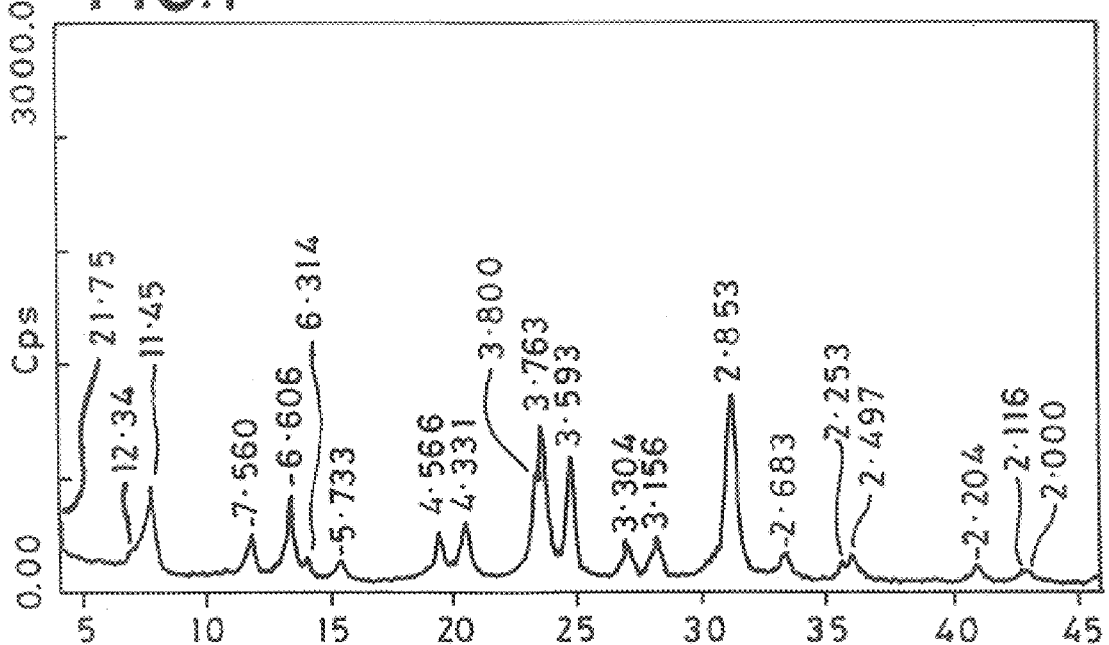
FIG. 1 is an x-ray diffraction pattern of the product of Example 1.
Figure 2:
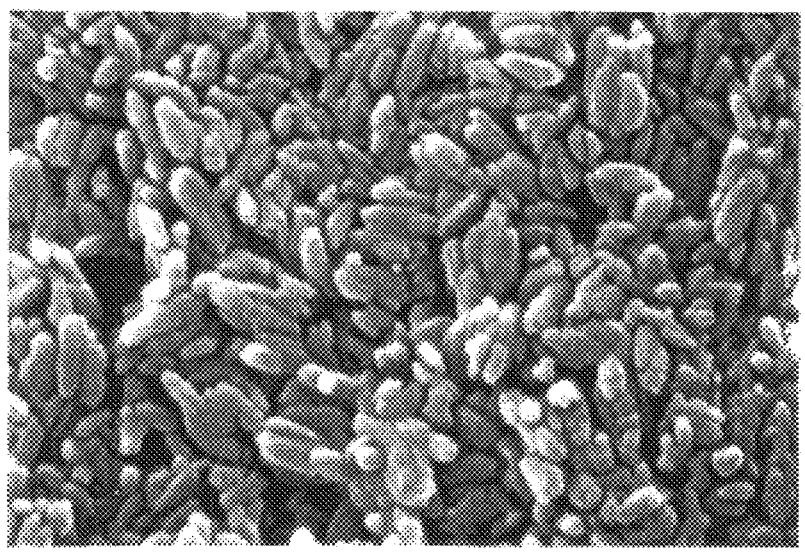
FIG. 2 is a scanning electron microscope (SEM) micrograph of the product of Example 1.

FIGS. 1 and 2 show X-ray diffractogram and peak values and SE micrographs of the products of Example 1.

EXAMPLE 2

In this example, the procedure of Example 1 was repeated, the sole difference being the replacement of the potassium hydroxide by substantially the same molar proportion of sodium hydroxide, to provide a synthesis mixture of molar composition:

$$2.78\ (TMA)_2O:0.47\ K_2O:0.50\ Na_2O:Al_2O_3:9.90\ SiO_2:91\ H_2O$$

(The $K_2O$ originated as contamination in the TMAOH.)

The synthesis mixture again developed a homogeneous whitish appearance. XRD and SEM analysis showed an Offretite product, consisting of spherulitic particles with a size of about 60 nm.

Figure 3:
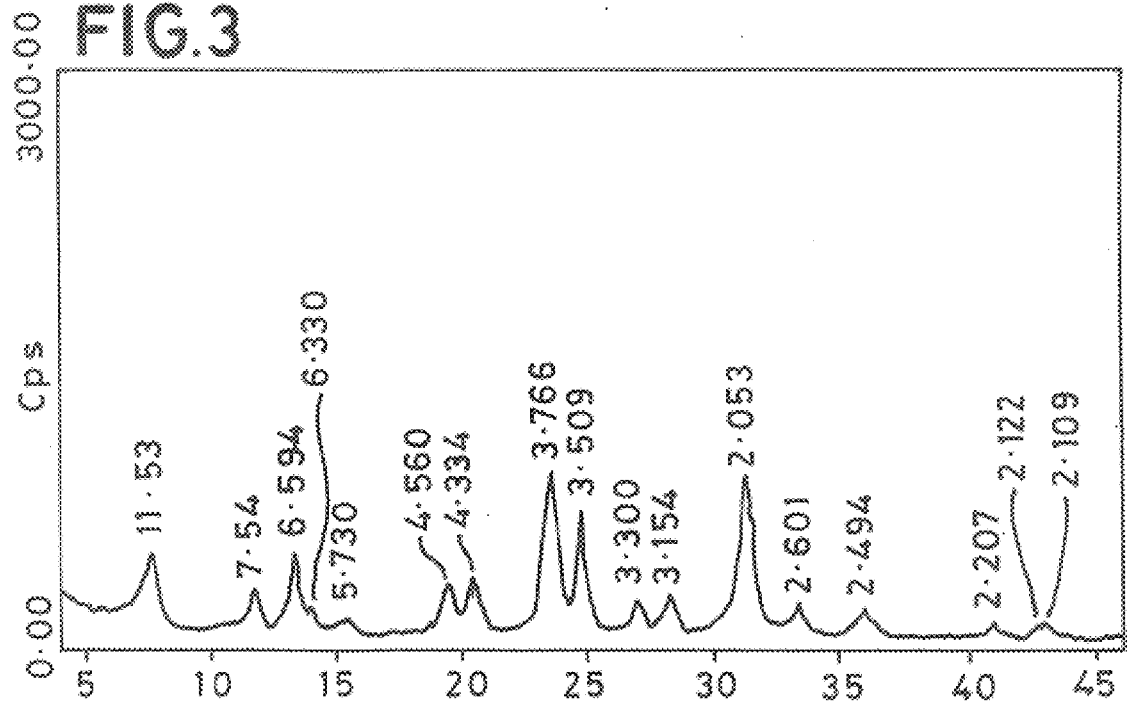
FIG. 3 is an x-ray diffraction pattern of the product of Example 2.
Figure 4:
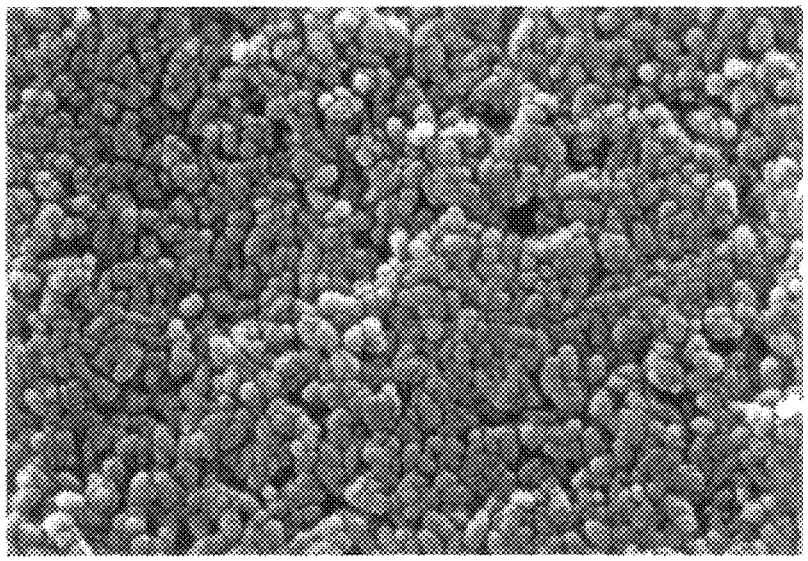
FIG. 4 is an SEM micrograph of the product of Example 2.

FIGS. 3 and 4 show X-ray diffractogram and peak values and SE micrographs of the product of Example 2.

EXAMPLE 3

A synthesis mixture was prepared as in Examples 1 and 2 but omitting any deliberate additional of alkali metal hydroxide. Subsequent analysis showed, however, that the TMAOH was contaminated with $K_2O$ to an extent of 1.83 wt. percent; it is believed that this small proportion of alkali metal suffices to ensure nanocrystalline product, by providing a synthesis mixture of the molar composition:

$$2.78\ (TMA)_2O:0.47\ K_2O:Al_2O_3:9.90\ SiO_2:91\ H_2O$$

The synthesis mixture was thermally treated as in Example 1. After 160 hours heating at 85° C., the crystallization was stopped. The originally inhomogeneous mixture changed during heating to a jelly; this, however, was transparent.

After washing using a 17500 rpm centrifuge, the product was suspended in the last wash water, a stable, colloidal, suspension resulting. A portion was evaporated to dryness and characterized by XRD and SEM. Although the diffractogram showed weak and broad peaks, the pattern was still recognizable as pure Offretite. The SEM showed that the product consisted of uniformly sized and shaped particles, about 45 nm×20 nm. XRD analysis of a portion of product calcined in air at 475° C. for 20 hours showed essentially no change in crystallinity, evidence of thermal stability.

Figure 7:
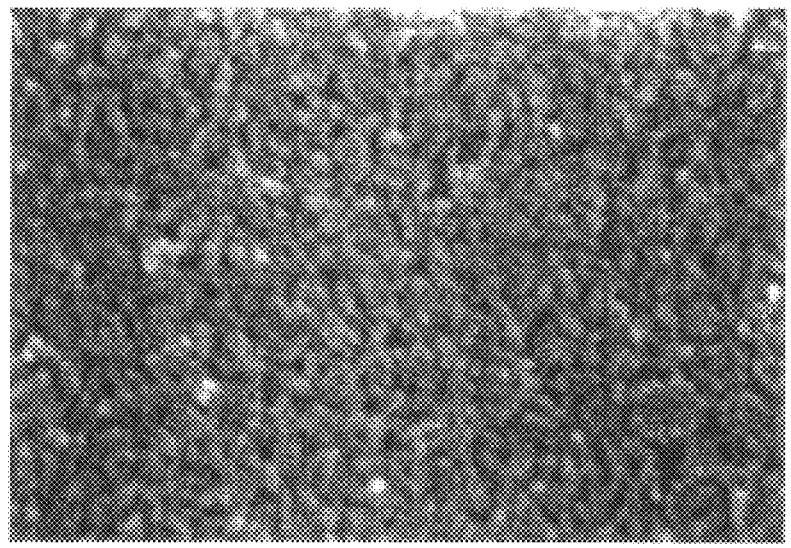
FIG. 7 is an SEM micrograph of the dried product of Example 3.

FIGS. 5, 6 and 7 show XRD diffractograms of the dried and calcined products and an SE micrograph of the dried product.

EXAMPLE 4

When the technical grade TMAOH used in Example 3 was replaced by a material of greater than 99% purity, no Offretite was produced. To show that the production of colloidal Offretite depends on the presence of potassium, a synthesis mixture was prepared using KOH and high purity TMAOH. The molar composition of the mixture was:

$$2.49\ (TMA)_2O:0.47\ K_2O:Al_2O_3:9.9\ SiO_2:91\ H_2O$$

The synthesis mixture was thermally treated at 85° C. for 6 days, and product recovered as described in Example 3. XRD showed the product to be pure Offretite, while SEM indicated a particle size of about 70×25 nm.

By way of comparison, a synthesis mixture of molar composition $$2.49\ (TMA)_2O:0.24\ K_2O:9.9\ SiO_2:91\ H_2O$$

was prepared using pure TMAOH and half the above proportion of KOH. XRD showed an Offretite product contaminated with sodalite.

EXAMPLE 5

This example illustrates the acceleration of Offretite formation by seeding. A synthesis mixture was prepared using the following components.

| | Parts by Weight |
|---|---|
| KOH pellets, 87.4% wt purity (Baker) | 39.40 |
| Al(OH)$_3$ powder, 98.5% wt purity (Alcoa) | 24.29 |
| H$_2$O, deionized | 286.55 |
| Ludox HS-40, 40% SiO$_2$ by weight in water (Du Pont) | 230.38 |
| TMACl, > 99% wt purity (Fluka) | 16.81 |
| Colloidal seed suspension, 5.36% wt % in water (From Ex. 3) | 2.81 |

The potassium hydroxide and hydrated alumina were dissolved in 115 parts water with boiling until a clear aluminate solution resulted. The TMA chloride was dissolved in 171.55 parts water, the solution added to the colloidal silica, the colloidal seeds were added to the resulting solution, and stirred for 3 minutes. The aluminate solution was then added and the resulting mixture stirred for 5 further minutes. Its molar composition was $$2.00\ K_2O:1.00\ TMACl:Al_2O_3:10\ SiO_2:160\ H_2O$$

and it contained 0.025 wt % colloidal Offretite.

For comparison purposes, a second synthesis mixture of identical molar proportions was prepared without seeds.

The seeded synthesis mixture was divided between four stainless steel autoclaves which were placed in an oven at room temperature. The oven was heated to 150° C. over the course of 2 hours. One autoclave was removed from the oven after 1 hour at 150° C. and rapidly cooled to room temperature with running water. The other three autoclaves were removed after 2, 3 and 4 hours at 150° C. and similarly cooled.

Figure 8:
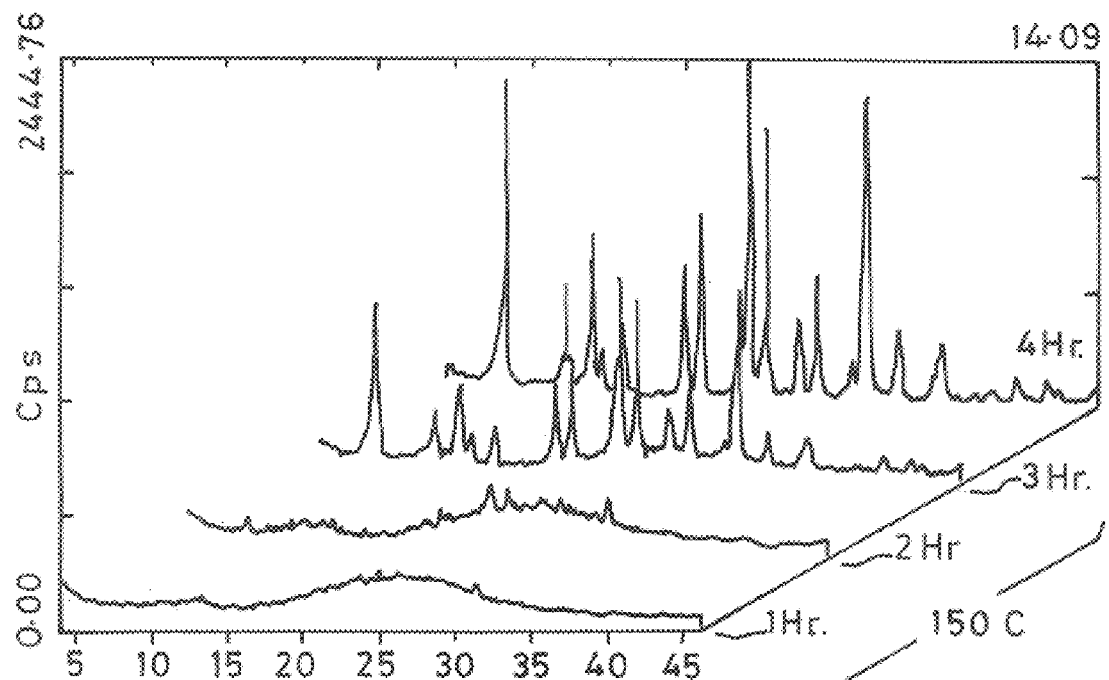
FIG. 8 shows x-ray diffraction patterns of seeded products crystallized for 1, 2, 3 and 4 hours according to Example 5.
Figure 9:
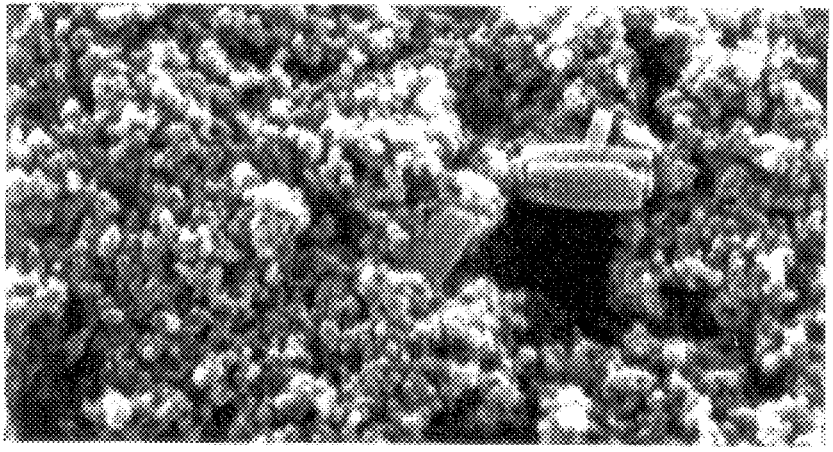
FIG. 9 is an SEM micrograph of a seeded product of Example 5 which has been crystallized for 1 hour.
Figure 10:
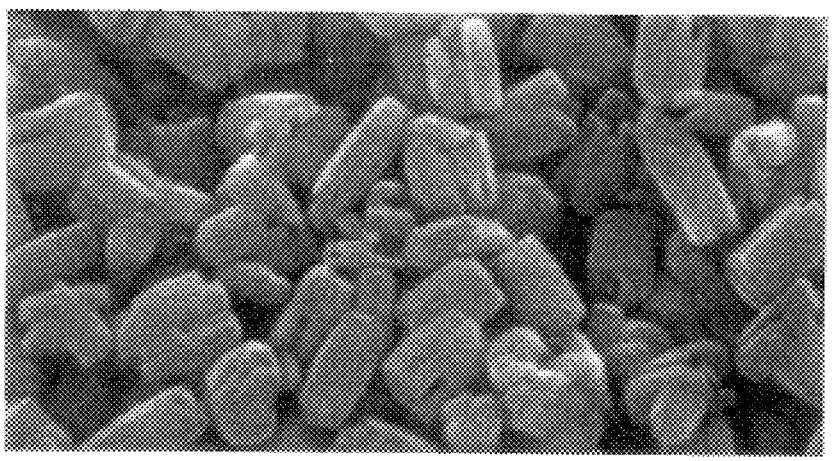
FIG. 10 is an SEM micrograph of a seeded product of Example 5 which has been crystallized for 4 hours.

The autoclave contents were washed with water to a pH about 10. After separation from the wash water by centrifuging, the products were dried in an oven for 16 hours at 110° C. From XRD and SEM analysis it appeared that crystallization had already started by 1 hour and the product was fully crystalline after 4 hours. FIG. 8 shows the XR-diffractograms of each product, and FIGS. 9 and 10 show the SE micrographs of the products after 1 and 4 hours respectively.

The unseeded mixture was divided between 5 autoclaves and treated identically to the seeded samples, except that one autoclave was withdrawn at each of 4, 8, 16, 48 and 72 hours at 150° C. XRD analysis shows that crystallization did not start until about 16 hours, and was not complete until about 48 hours.

EXAMPLE 6

This example demonstrates the control of crystallite size by concentration of seed crystals.

A synthesis mixture was prepared using the following components.

| | Parts by Weight |
|---|---|
| KOH pellets, 87.4% wt purity (Baker) | 25.67 |
| Al(OH)$_3$ powder, 98.5% wt purity (Alcoa) | 15.84 |

|  | Parts by Weight |
| --- | --- |
| H₂O, deionized | 189.19 |
| Ludox HS-40, 40% SiO₂ by weight in water (Du Pont) | 150.23 |
| TMACl, > 99% wt purity (Fluka) | 10.95 |

The potassium hydroxide and hydrated alumina were dissolved in 75.20 parts water with boiling until a clear aluminate solution resulted. The TMA chloride was dissolved in 133.99 parts water, the solution added to the colloidal silica, and stirred for 3 minutes. The aluminate solution was then added and the resulting synthesis mixture stirred for 5 further minutes. Its molar composition was $$2.00\ K_2O:1.00\ TMACl:Al_2O_3:10\ SiO_2:160\ H_2O$$

Eleven identical synthesis solutions were prepared, one of which was left unseeded for comparison purposes. The other ten samples were seeded with colloidal Offretite crystals at 2, 4, 8, 16, 31, 62, 128, 251, 501, and 1002 ppm by weight, based on the weight of the synthesis mixture. To avoid any unwanted seeding effects, the autoclaves used for hydrothermal treatment were each treated twice with 4 molar KOH solution for 16 hours at 110° C., thereby dissolving any zeolite crystals adhering to the autoclave interior from any previous synthesis. The autoclaves were heated to 150° C. as described in Example 5, the seeded samples being maintained at that temperature for 48 hours, and the unseeded comparison for 72 hours, in each case without stirring. The products of the seeded synthesis were washed to a pH of 10.4, and that of the unseeded synthesis to pH 9.8, and dried at 120° C. and 110° C. respectively. XRD showed that all products were excellently crystalline and pure Offretite. Analysis of the SEM micrographs showed that the crystallites of each seeded sample were remarkably uniform in size and shape, while the crystallites of the comparison unseeded sample had a wide particle size distribution; the average size of the rod-like crystals was 6.5 μm in length, 3.5 μm in diameter, but the smallest particle size was about 2.4 μm long, while the largest was about 9.2 μm. The table below shows the average length and diameter, and the length:diameter ratio, of each of the samples.

| Seeds added, ppm | Particle size, μm, by SEM | | |
| --- | --- | --- | --- |
| | length | diameter | l/d ratio |
| none | 6.5 | 3.5 | 1.9 |
| 2 | 1.55 | 1.03 | 1.5 |
| 4 | 1.30 | 0.78 | 1.7 |
| 8 | 1.08 | 0.71 | 1.5 |
| 16 | 0.81 | 0.52 | 1.6 |
| 31 | 0.68 | 0.45 | 1.5 |
| 62 | 0.51 | 0.33 | 1.5 |
| 128 | 0.41 | 0.21 | 1.9 |
| 251 | 0.33 | 0.19 | 1.7 |
| 501 | 0.25 | 0.13 | 1.9 |
| 1002 | 0.20 | 0.09 | 2.2 |

Figure 11:
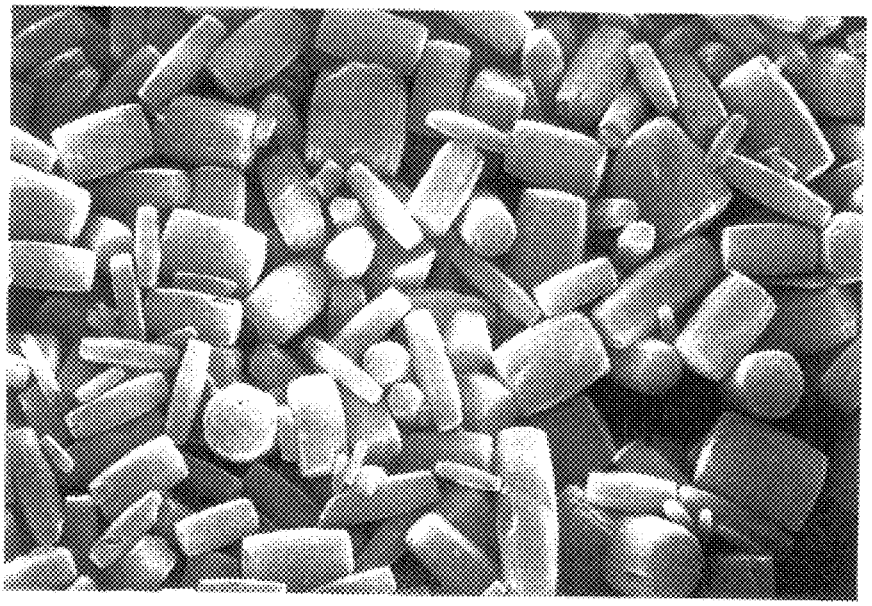
FIG. 11 is an SEM micrograph of the product of Example 6 which was crystallized in the absence of added seeds.
Figure 12:
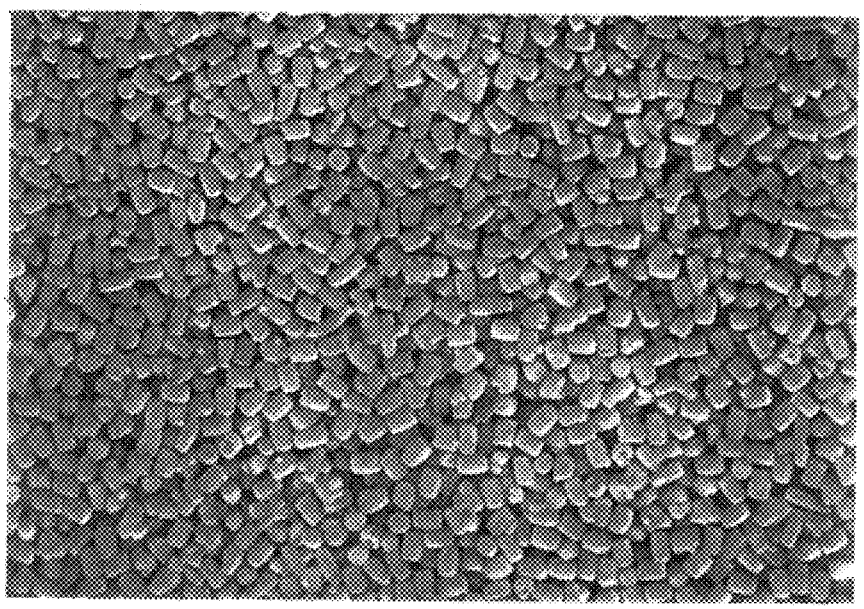
FIG. 12 is an SEM micrograph of the product of Example 6 which was crystallized in presence of 2 weight ppm seeds.

FIG. 11 shows the SEM of the comparison sample, FIG. 12 that of the sample with 2 ppm seeds.

EXAMPLE 7

This example demonstrates the use of seeds to avoid the need for an organic template in Offretite manufacture.

A synthesis mixture was prepared using the following components.

|  | Parts by Weight |
| --- | --- |
| KOH pellets, 87.4% wt purity (Baker) | 25.70 |
| Al(OH)₃ powder, 98.5% wt purity (Alcoa) | 15.84 |
| H₂O, deionized | 185.67 |
| Ludox HS-40, 40% SiO₂ by weight in water (Du Pont) | 150.23 |
| Colloidal seed suspension, 5.36 wt % in water (from Ex. 3) | 3.56 |

The potassium hydroxide and hydrated alumina were boiled in 75.02 parts water until clear. The colloidal silica was diluted with 110.65 parts of water, the colloidal seeds added to the resulting solution, and stirred for 3 minutes. The aluminate solution was then added and the resulting synthesis mixture stirred for 3 further minutes. Its molar composition was $$2.00\ K_2O:Al_2O_3:10\ SiO_2:160\ H_2O$$

and it contained 0.050 wt % colloidal Offretite.

For comparison purposes, a second synthesis mixture of identical molar proportions was prepared without seeds.

The synthesis mixtures were placed in separate autoclaves, heated to 150° C. as described in Example 5, and maintained at that temperature for 96 hours. The resulting products were washed with water to a pH of 10.5 and dried at 110° C. The yield of the process according to the invention was about 17%, based on the total weight of synthesis mixture.

X-ray diffraction analysis of the product of the seeded process showed the characteristic pattern of Offretite, slightly contaminated with zeolite W, SEM showing rod-like particles of about 2 μm length and 0.1 μm diameter. Thermographic analysis showed a micropore capacity for toluene of 2.86%. The comparison process yielded a mixture of zeolite W and amorphous material.

EXAMPLE 8

To reduce the contamination by zeolite W resulting from the process of Example 7, the alkalinity of the synthesis mixture was increased, to give a molar composition of $$2.20\ K_2O:Al_2O_3:10\ SiO_2:160\ H_2O$$

seeding with 0.0502% colloidal Offretite crystals, other components and reaction conditions being as in Example 7. XRD analysis showed an Offretite product free from zeolite W but now slightly contaminated with zeolite KL. Thermographic analysis showed a micropore capacity for toluene of 3.69%, which confirms the absence of zeolite W.

EXAMPLE 9

EXAMPLE 7 was repeated with a synthesis mixture of the following molar composition:

$$2.10\ K_2O:Al_2O_3:10\ SiO_2:160\ H_2O$$

Figure 13:
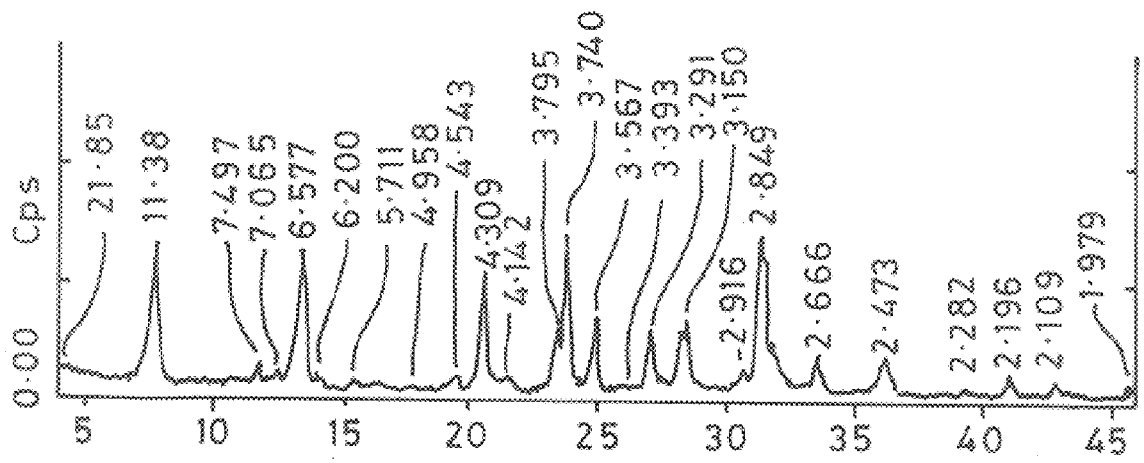
FIG. 13 is an x-ray diffraction pattern of the product of Example 9.
Figure 14:
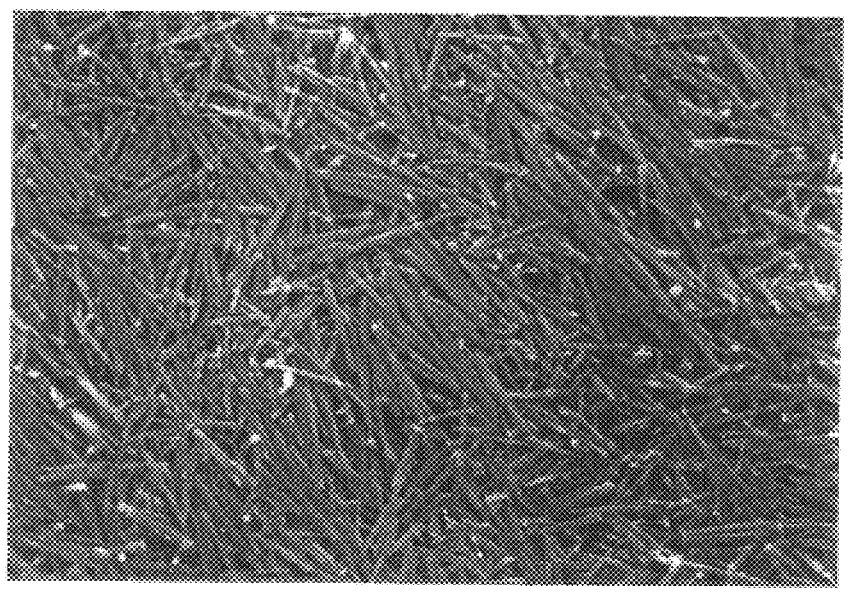
FIG. 14 is an SEM micrograph of the product of Example 9.

XRD analysis shows an Offretite product free from both zeolites KL and W. FIGS. 13 and 14 show XRD and SEM of the product of this example.

EXAMPLE 10

The procedure of Example 9 was repeated, but using 0.075% by weight Offretite seeds. In a comparison example, a similar synthesis mixture, but with no seeds, was used.

The synthesis mixture seeded with Offretite gave an Offretite product, with no KL or W contamination.

The unseeded mixture gave a largely amorphous product with small proportions of W and KL.

EXAMPLE 11

This example illustrate the preparation of Gallium Offretite. A synthesis mixture was prepared using the following components:

| Solution A | Parts by Weight |
|---|---|
| KOH pellets, 87.4 wt % purity (Baker) | 28.15 |
| $Ga_2O_3$, 99.999 wt % purity (Ingal) | 17.86 |
| $H_2O$, deionized (of which 39 parts are used to transfer the solution quantitatively to Solution B) | 74.03 |

The potassium hydroxide and gallium oxide were dissolved in water with boiling, and the solution allowed to cool to room temperature.

| Solution B | Parts by Weight |
|---|---|
| Ludox HS-40 | 143.13 |
| TMACl, > 99% wt purity (Fluka) | 10.44 |
| $H_2O$, deionized | 107.13 |
| Colloidal Offretite Seed Suspension, 5.36 wt % in water (Ex. 3) | 1.80 |

The TMACl was dissolved in 54.41 parts water. The silica gel was weighed into a blender, and the colloidal suspension and the TMACl solution added; 52.72 parts of water were used as rinse water to effect quantitative transfer of the TMACl solution. After 2 minutes stirring of solution B, solution A was added, and stirring continued for a further 4 minutes. A slightly blueish, clear, non-gelling mixture resulted, of molar composition:

2.3 $K_2O$:1.00 TMACl:1.00 $Ga_2O_3$:10 $SiO_2$:159 $H_2O$ and containing 0.025 wt % colloidal Offretite. 324.85 parts of synthesis mixture were transferred to a stainless steel autoclave which was placed in a room temperature oven. The oven was heated over 2 hours to 150° C. and maintained at that temperature for 8 hours.

The product was washed several times until the pH of the washwater was 9.7, and dried at 120° C. 61.8 parts of product were recovered.

Figure 15:
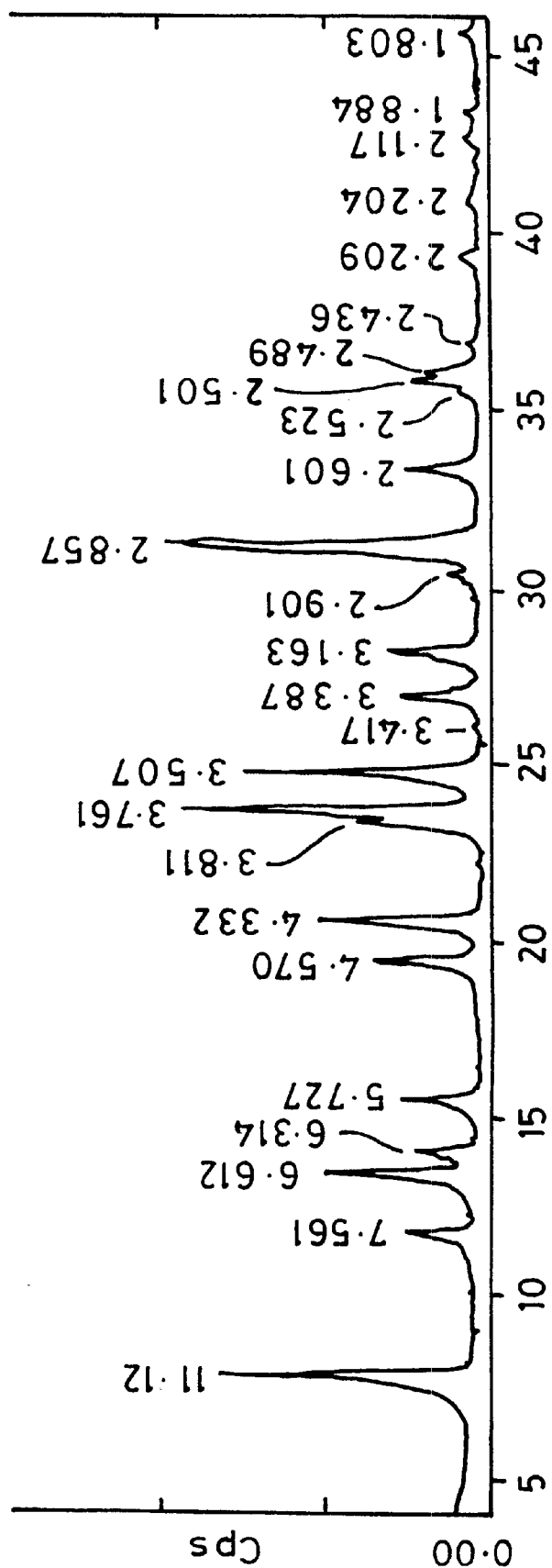
FIG. 15 is an x-ray diffraction pattern of a product of Example 11.
Figure 16:
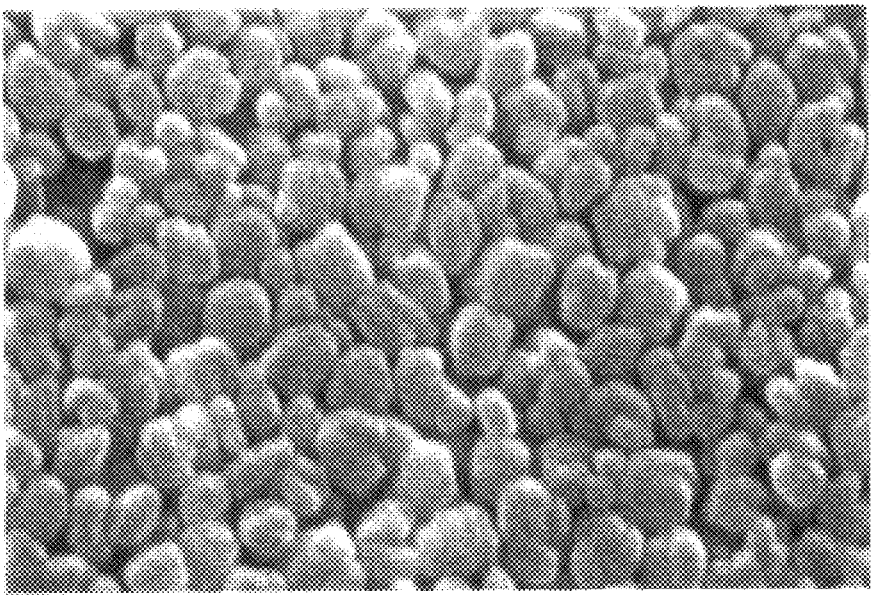
FIG. 16 is an SEM micrograph of a product of Example 11.

XRD (FIG. 15) showed that the product was fully crystalline Offretite, SEM (FIG. 16) showed that it was formed of extremely uniform ovate particles with a size of 0.25 μm.

Four comparison experiments were carried out. In the first, a synthesis mixture of the same molar composition but omitting seeds was subjected to the same hydrothermal treatment for 8 hours. The product was completely amorphous. In the second, the same synthesis mixture was seeded with 0.22% by weight of micron size aluminium-based Offretite seeds, the seeds being dispersed in the synthesis mixture by vigorous mixing with a magnetic stirrer for 5 minutes, and then subjected to the same hydrothermal treatment for 8 hours. XRD showed the product to be largely amorphous. In the third and fourth comparisons, the unseeded and micron-seeded mixtures were subjected to hydrothermal treatment at 150° C. for 70 hours. XRD of the unseeded and seeded products showed a crystalline Offretite product, but contaminated with other dense, crystalline phases. SEM of the unseeded product showed further contamination by unreacted gel particles.

The results show that the use of colloidal Offretite is necessary to obtain pure Ga-Offretite, and also speeds reaction rate significantly.

EXAMPLE 12

A gallium-based synthesis mixture with a lower potassium content and containing colloidal seeds was formed in the same way as described in Example 11; its molar position was:

2.00 $K_2O$:1.00 TMACl:1.00 $Ga_2O_3$:10 $SiO_2$:159 $H_2O$ and it contained 0.025% colloidal Offretite.

Figure 17:
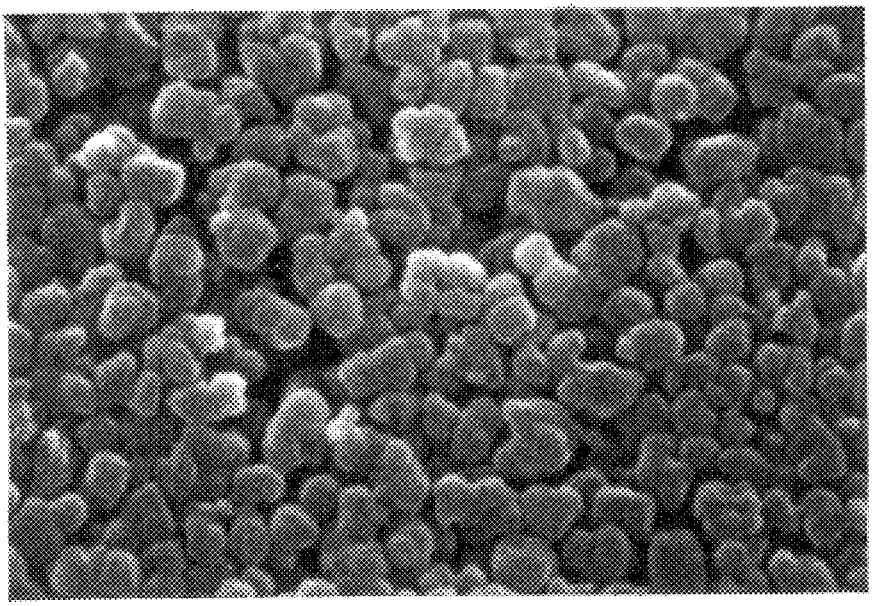
FIG. 17 is an SEM micrograph of the product of Example 12.

324 parts of synthesis mixture were hydrothermally treated for 8 hours as described in Example 11. 64 parts of product were recovered. XRD showed that the product was pure Offretite, while SEM (FIG. 17) showed it was formed of extremely uniform ovate particles of size 0.20 μm. This indicates the control of particle size by variation of alkalinity.

I claim:

1. A process for the manufacture of a colloidal suspension of Offretite, wherein a synthesis mixture having a molar composition, when calculated in terms of oxides, in the following ranges:

| $K_2O:Al_2O_3$ | 0.25 to 0.5:1 |
|---|---|
| $(TMA)_2O:Al_2O_3$ | at least 2.0:1 |
| $SiO_2:Al_2O_3$ | 8 to 10:1 |
| $H_2O:Al_2O_3$ | 80 to 100:1 | wherein TMA represents the tetramethylammonium cation, is subjected to thermal treatment at a temperature and for a time sufficient to form a colloidal suspension of Offretite having a maximum dimension of at most 100 nm.

2. A process as claimed in claim 1, wherein the molar ratio of $(TMA)_2O:Al_2O_3$ is within the range of from 2.0 to 3.5:1.

3. A process as claimed in claim 1, wherein the thermal treatment is carried out at a temperature within the range of 40° C. to 100° C.

4. A process as claimed in claim 1, wherein the colloidal suspension is washed with water optionally cation exchanged, dried and optionally calcined.

5. The process of claim 1 wherein said $K_2O$ in said synthesis mixture is replaced with $Na_2O$.

6. A process for the manufacture of Offretite which comprises forming an Offretite-forming synthesis mixture containing seed crystals of Offretite of maximum dimension at most 100 nm, and subjecting the seed-containing synthesis mixture to hydrothermal treatment at a temperature and for a time sufficient to form Offretite, said seed crystals prepared by the process of claim 1.

7. A process as claimed in claim 6, wherein the synthesis mixture has a molar composition, calculated in terms of oxides, in the following ranges:

| $M_2O:Al_2O_3$ | 1.3 to 4.0:1 |
|---|---|
| $(TMA)_2O:Al_2O_3$ | 0.2 to 0.6:1 |
| $SiO_2:Al_2O_3$ | 7 to 13:1 |
| $H_2O:Al_2O_3$ | 50 to 540:1 | wherein M represents an alkali metal cation, at least 70 molar per cent of which is represented by potassium, any remainder being represented by sodium.

8. A process as claimed in claim 6, wherein the synthesis mixture has a molar composition, calculated in terms of oxides, in the following ranges:

|  |  |
|---|---|
| $M_2O:Ga_2O_3$ | 1.3 to 4.0:1 |
| $(TMA)_2O:Ga_2O_3$ | 0.2 to 0.6:1 |
| $SiO_2:Ga_2O_3$ | 7 to 13:1 |
| $H_2O:Ga_2O_3$ | 50 to 540:1 | wherein M represents an alkali metal cation, at least 70 molar per cent of which is represented by potassium, any remainder being represented by sodium.

9. A process as claimed in claim 6, wherein hydrothermal treatment is carried out for from 2 to 10 hours.

10. The process of claim 3 wherein said seed crystals are present in said synthesis mixture at a level of from 0.0002 to 0.1% by weight of the total synthesis mixture.

11. The process of claim 10 wherein said seed crystals are present at a level of 0.01 to 0.05% by weight of said synthesis mixture.

12. A process for the manufacture of Offretite which comprises forming a synthesis mixture, substantially free from free organic structure directing agent, and having a molar composition, calculated in terms of oxides, in the following ranges:

|  |  |
|---|---|
| $M_2O:Al_2O_3$ | 1.9 to 2.1:1 |
| $SiO_2:Al_2O_3$ | 9 to 11:1 |
| $H_2O:Al_2O_3$ | 140 to 180:1 | wherein M represents potassium, of which up to 30 molar percent may be replaced by sodium, and also containing seed crystals of Offretite of maximum dimension at most about 100 nm, and subjecting the seed-containing synthesis mixture to hydrothermal treatment for a time and at a temperature sufficient to form Offretite.

13. The process of claim 12 wherein said seed crystals are present in said synthesis mixture at a level from 0.0002 to 0.1% by weight of the total synthesis mixture.

14. The process of claim 13 wherein said seed crystals are present at a level of from 0.01 to 0.05% by weight of said synthesis mixture.

15. The process of claim 12 wherein said hydrothermal treatment is carried out at a temperature in the range of about 100° C. to 200° C.

* * * * *